United States Patent
Kasslin et al.

(10) Patent No.: US 10,966,155 B1
(45) Date of Patent: Mar. 30, 2021

(54) DISTANCE AWARE WAKE-UP RADIO OPERATION

(71) Applicant: Nokia Technologies Oy, Espoo (FI)

(72) Inventors: Mika Kasslin, Espoo (FI); Enrico Henrik Rantala, Berkeley, CA (US); Janne Marin, Espoo (FI); Olli Alanen, Vantaa (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/771,562

(22) PCT Filed: Dec. 14, 2018

(86) PCT No.: PCT/FI2018/050926
§ 371 (c)(1),
(2) Date: Jun. 10, 2020

(87) PCT Pub. No.: WO2019/122515
PCT Pub. Date: Jun. 27, 2019

Related U.S. Application Data

(60) Provisional application No. 62/609,357, filed on Dec. 22, 2017.

(51) Int. Cl.
*H04W 52/02* (2009.01)
(52) U.S. Cl.
CPC ... *H04W 52/0245* (2013.01); *H04W 52/0229* (2013.01)
(58) Field of Classification Search
CPC . H04W 52/00; H04W 52/02; H04W 52/0209; H04W 52/0216; H04W 52/0225;
(Continued)

(56) References Cited

U.S. PATENT DOCUMENTS

2012/0190390 A1* 7/2012 Reunamaki ....... H04W 52/0229
455/500
2016/0021612 A1 1/2016 Matsunaga et al.
(Continued)

OTHER PUBLICATIONS

Huang et al., "WUR Action Frame Format Follow up", IEEE 802.11-17(1627r2, Nov. 6, 2017, pp. 1-20.
(Continued)

*Primary Examiner* — Siu M Lee
(74) *Attorney, Agent, or Firm* — Nokia Technologies Oy

(57) ABSTRACT

In a method for low-power wireless communication, a primary connectivity radio transmits a wake-up radio configuration request to a wireless device and receives a wireless wake-up configuration response comprising a wake-up identifier for distance aware wake-up notification mode. A companion low-power wake-up radio receives from the wireless device, a wireless wake-up radio measurement reference for which it measures a receive signal strength, determines it as a reference level, and associates the reference level with the wake-up identifier. The wake-up radio then receives from the wireless device, a wake-up frame that includes a received wake-up identifier. The wake-up radio determines that the received wake-up identifier compares with the wake-up identifier associated with the reference level. The wake-up radio measures a receive signal strength of the wireless wake-up frame and wakes-up the primary connectivity radio, if the receive signal strength of the wireless wake-up frame is above the reference level.

14 Claims, 13 Drawing Sheets

(58) Field of Classification Search
CPC ......... H04W 52/0229; H04W 52/0232; H04W 52/0245
See application file for complete search history.

(56) References Cited

U.S. PATENT DOCUMENTS

| | | |
|---|---|---|
| 2016/0150474 A1 | 5/2016 | Ang et al. |
| 2016/0278013 A1 | 9/2016 | Shellhammer et al. |
| 2017/0094600 A1 | 3/2017 | Min et al. |
| 2017/0280392 A1 | 9/2017 | Segev et al. |
| 2018/0063788 A1* | 3/2018 | Yang ................. H04W 52/0241 |
| 2018/0069683 A1* | 3/2018 | Huang ................. H04L 5/0092 |
| 2018/0242249 A1* | 8/2018 | Yang ................. H04W 52/0229 |
| 2019/0045444 A1* | 2/2019 | Huang ............. H04W 52/0216 |
| 2019/0075520 A1* | 3/2019 | Li ...................... H04W 52/028 |
| 2019/0372815 A1* | 12/2019 | Suh .................... H04L 27/2611 |

OTHER PUBLICATIONS

Rantala et al., "Distance aware wake-up operation", IEEE 802.11-17/1696r0, Nov. 5, 2017, pp. 1-8.
International Search Report and Written Opinion received for corresponding Patent Cooperation Treaty Application No. PCT/FI2018/050926, dated Mar. 11, 2019, 19 pages.

* cited by examiner

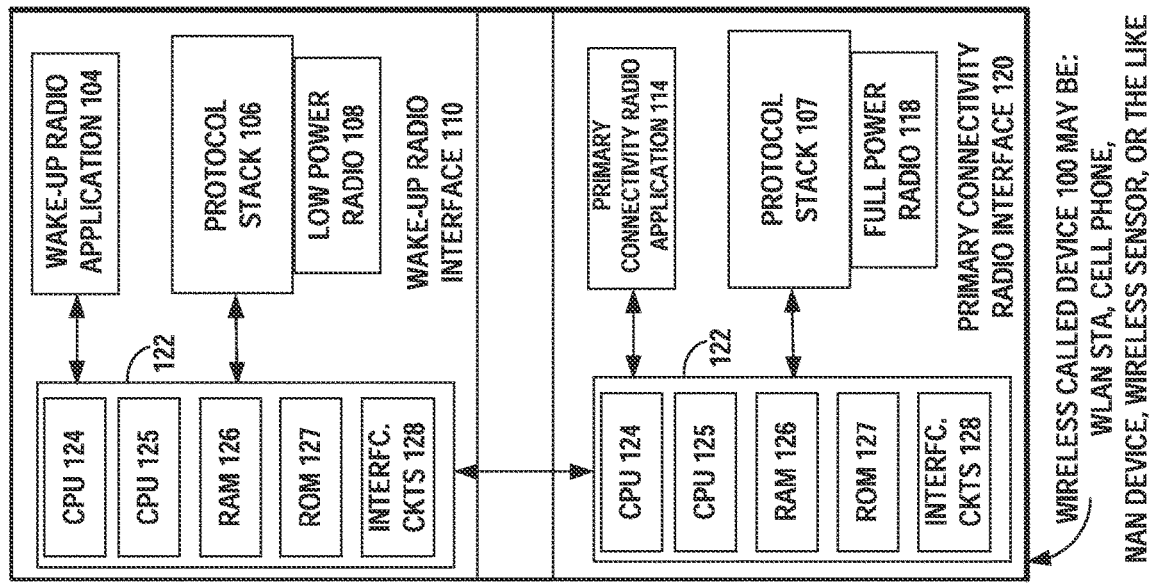
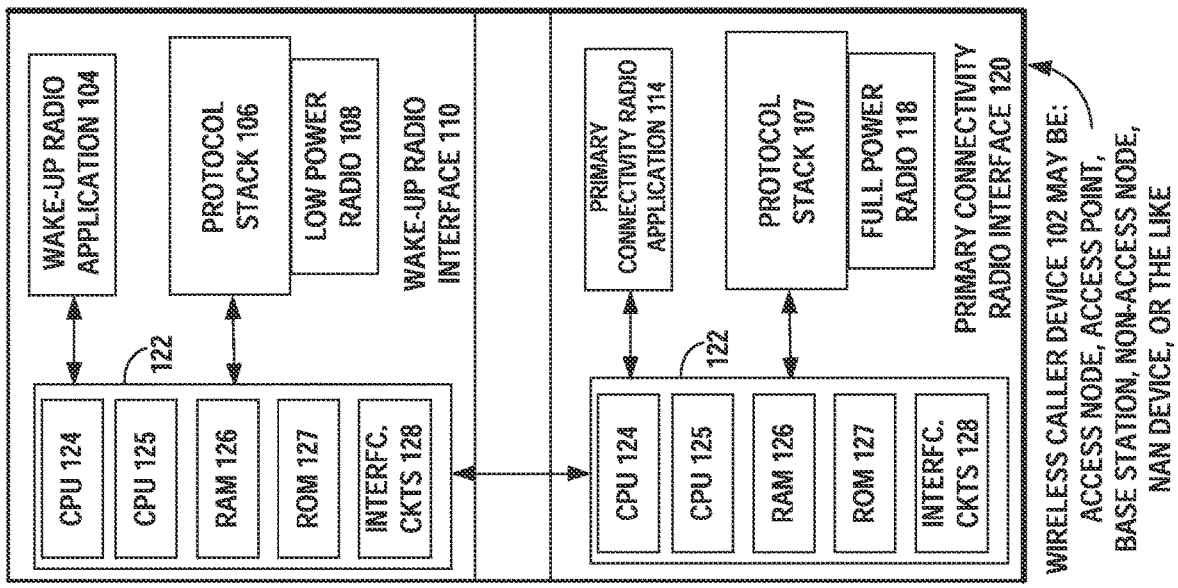
FIG. 2
SETUP OF
A DISTANCE AWARE WAKE-UP
NOTIFICATION MODE

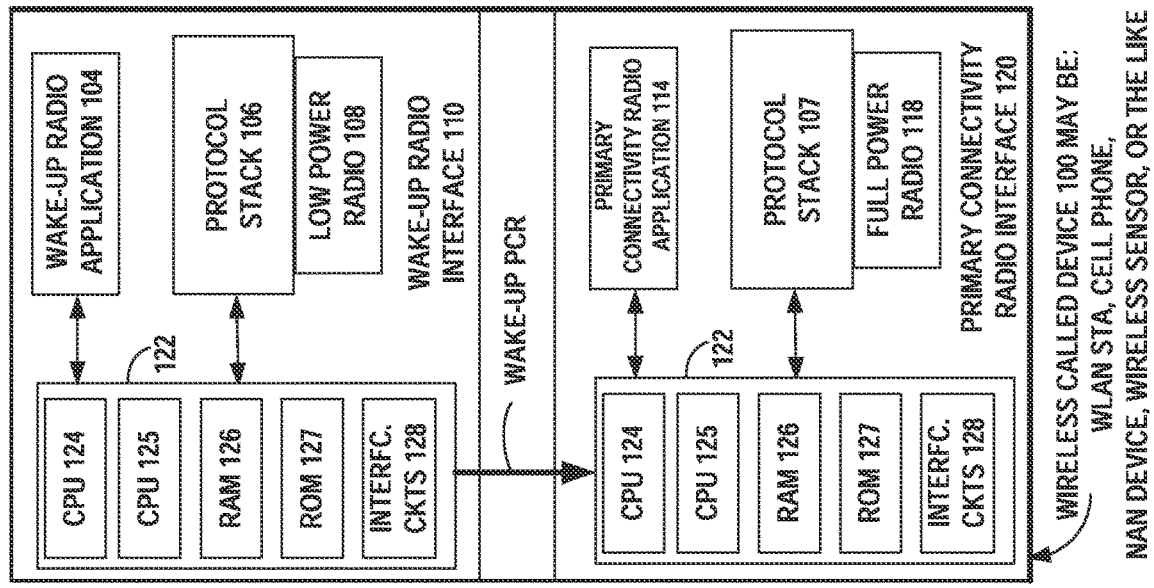
FIG. 3
TRANSMISSION BY CALLER DEVICE OF A WAKE-UP FRAME (WUF) IN DISTANCE AWARE WAKE-UP NOTIFICATION MODE
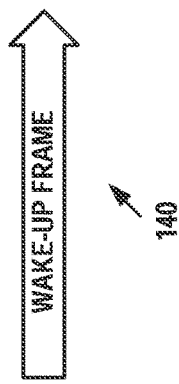
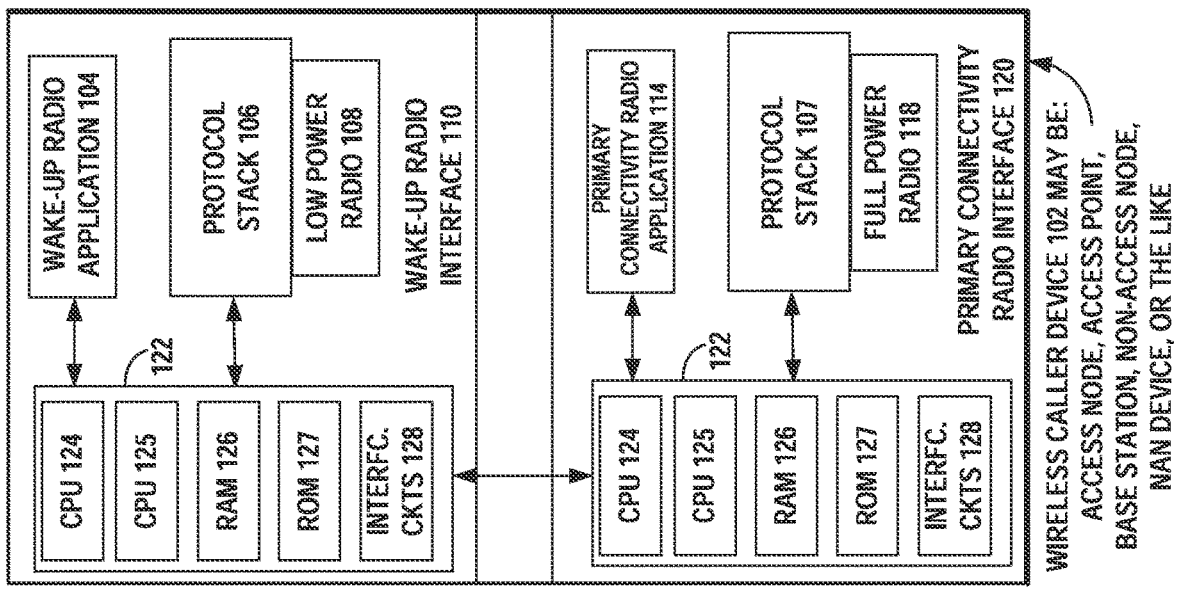

600

DISTANCE AWARE WAKE-UP RADIO OPERATION

RELATED APPLICATION

This application claims priority to PCT Application No. PCT/FI2018/050926 filed on Dec. 14, 2018, which claims priority to U.S. Provisional Application No. 62/609,357, filed Dec. 22, 2017, each of which is incorporated herein by reference in its entirety.

FIELD

The field of the invention relates to wireless short-range communication and more particularly relates to low-power wake-up radio awaking a primary connectivity radio in response to receiving wake-up frames from an access point at a desired distance.

BACKGROUND

Low-power wake-up radio (WUR) enables power-savings by allowing a primary connectivity radio to remain disabled or asleep for longer periods. The low-power wake-up radio is a companion radio to a primary connectivity radio. A wireless device such as a STA or a cellular telephone may comprise both the primary connectivity radio and a companion low-power wake-up radio.

SUMMARY

Method, apparatus, and computer program product example embodiments provide a low-power wake-up radio design that allows distance estimation using, for example relative signal power level estimation.

According to an example embodiment of the invention, a method comprises at least some of the following features:

transmitting, by a primary connectivity radio of a first wireless device, a wireless wake-up radio configuration request message to a second wireless device, requesting setup of a distance aware wake-up notification mode to enable the first wireless device to wake-up the primary connectivity radio when it is disabled, in response to a companion low-power wake-up radio of the first wireless device receiving a wake-up frame from the second wireless device;

receiving, by the primary connectivity radio, from the second wireless device, a wireless wake-up configuration response message comprising a wake-up identifier for the distance aware wake-up notification mode;

receiving, by the companion low-power wake-up radio, from the second wireless device, a wireless wake-up radio measurement reference message;

measuring, by the first wireless device, a receive signal strength of the wireless wake-up radio measurement reference message, determining a reference level value based at least partly on the receive signal strength of the wireless wake-up radio measurement reference message, and associating the reference level value with the wake-up identifier for the distance aware wake-up notification mode;

receiving, by the companion low-power wake-up radio, from the second wireless device, a wake-up frame that includes a received wake-up identifier;

measuring, by the companion low-power wake-up radio, a receive signal strength of the wireless wake-up frame; and waking-up, by the first wireless device, the primary connectivity radio, if the receive signal strength of the wireless wake-up frame is above the reference level value and if the received wake-up identifier corresponds to the wake-up identifier for the distance aware wake-up notification mode associated with the reference level value.

The wake-up radio configuration request message may comprise a requested distance, the wake-up radio configuration response message comprises an offset value that is based on the requested distance, and wherein said determining the reference level value comprises determining the reference level value based at least partly on the receive signal strength of the wireless wake-up radio measurement reference message and on the offset value.

The second wireless device may be an access node, such as an access point or base station, or the second wireless device may be another non-access point station or a neighbor awareness networking device.

The wireless wake-up configuration response message may comprise an offset value for use with wake-up frames that are to be identified in the distance aware wake-up notification mode, and the determining the reference level value may be based at least partly on the offset value.

According to an example embodiment of the invention, a method comprises at least some of the following features:

receiving, by a first wireless device, from a primary connectivity radio of a second wireless device, a wireless wake-up radio configuration request message, requesting setup of a distance aware wake-up notification mode to enable the second wireless device to wake-up the primary connectivity radio when it is disabled, in response to a low-power wake-up radio of the second wireless device receiving a wake-up frame from the first wireless device;

transmitting, by the first wireless device, to the primary connectivity radio, a wireless wake-up configuration response message comprising a wake-up identifier for the distance aware wake-up notification mode;

transmitting, by the first wireless device, to the companion low-power wake-up radio, a wireless wake-up radio measurement reference message; and transmitting, by the first wireless device, to the companion low-power wake-up radio, a wake-up frame that includes the wake-up identifier for the distance aware wake-up notification mode, thereby enabling the second wireless device to wake-up the primary connectivity radio, if a receive signal strength of the wireless wake-up frame measured by the companion low-power wake-up radio, is above a reference level value that is at least partly based on a receive signal strength of the wireless wake-up radio measurement reference message measured by the companion low-power wake-up radio.

The first wireless device may be an access node, such as an access point or base station or the first wireless device is another non-access point station or a neighbor awareness networking device.

The method may further comprise measuring, by the first wireless device, a received signal strength of the wireless wake-up radio configuration request message, estimating path loss between the second wireless device and the first wireless device, and estimating a current distance between the second wireless device and the first wireless device based on the path loss estimate.

The wireless wake-up configuration response message may comprise an offset value for use with wake-up frames that are to be identified in the distance aware wake-up notification mode.

The wireless wake-up radio measurement reference message may be transmitted at a transmit power corresponding to a sum of a reference level value, an offset value, and an estimated path loss or the wireless wake-up radio measurement reference message is transmitted at a transmit power having a fixed value.

The wake-up radio configuration request message may comprise a requested distance, the wake-up radio configuration response message comprises an offset value for use with wake-up frames that are to be identified in the distance aware wake-up notification mode, and the offset value is based on the requested distance.

DESCRIPTION OF THE FIGURES

FIG. 2 illustrates an example wireless network showing setup of a distance aware wake-up notification mode between a wireless caller device or access node and a wireless called device or STA. The figure includes a functional block diagram of wireless caller device and a functional block diagram of the wireless called device that includes the primary connectivity radio and the companion low-power wake-up radio. The wireless caller device may be an access node, an access point, a base station, a non-access node, a NAN device, or the like. The wireless called device may be WLAN STA, cell phone, NAN device, wireless sensor, or the like.

FIG. 3 illustrates the example wireless network of FIG. 2, showing transmission by the wireless caller device of a wake-up frame (WUF) in the distance aware wake-up notification mode, to wake-up the primary connectivity radio of the wireless called device.

DISCUSSION OF EXAMPLE EMBODIMENTS OF THE INVENTION

Figure 1:
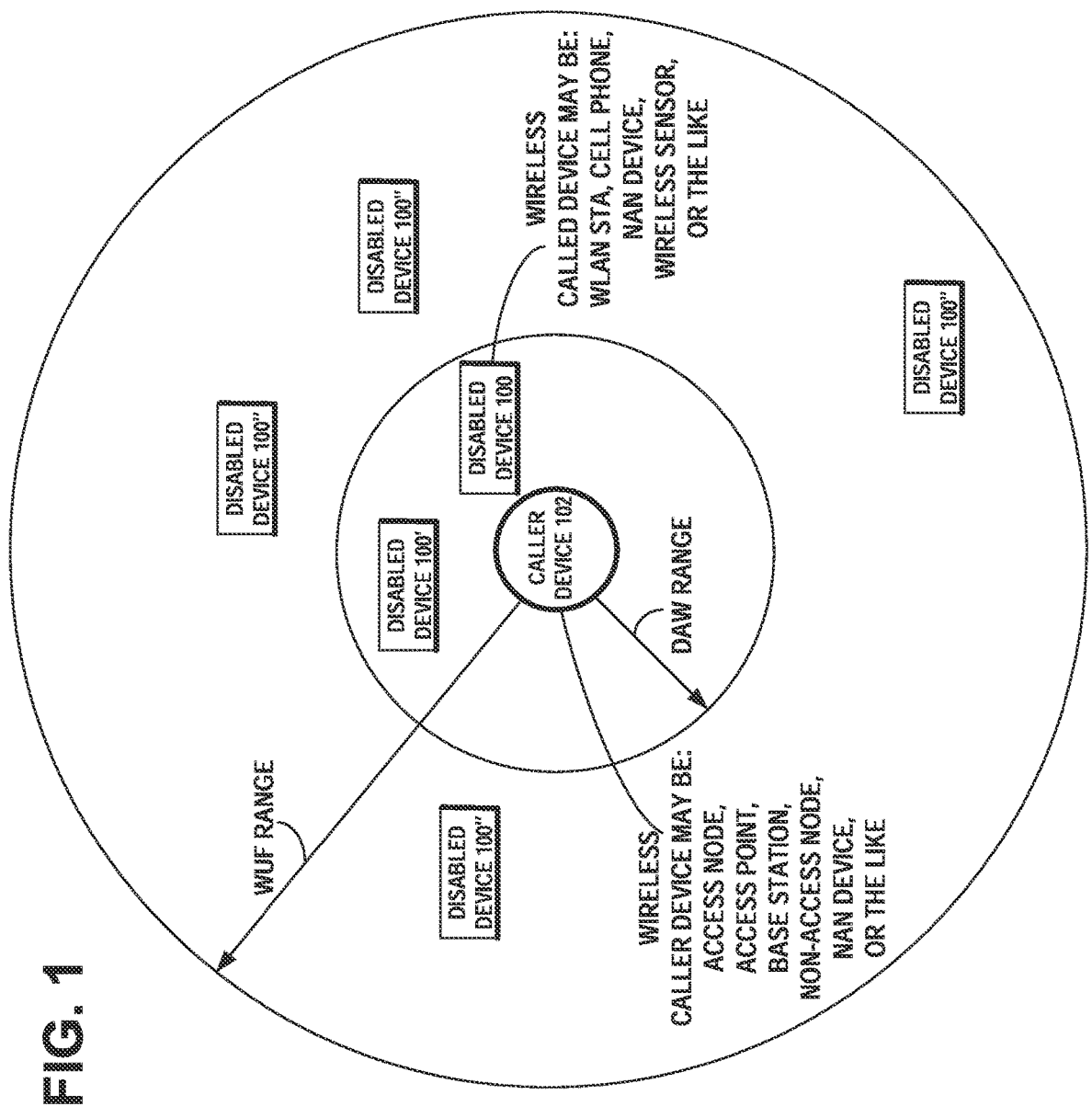
FIG. 1 illustrates an example conceptual drawing depicting distance aware wake-up (DAW) range. In the figure, disabled (or sleeping) wireless devices that meet a distance and identity requirement wake-up their primary connectivity radio interface due to receiving a wake-up frame (WUF), while other disabled wireless devices that do not meet the distance and identity requirement, continue sleeping.

Low-power wake-up radio (WUR) enables power-savings by allowing a primary connectivity radio to remain disabled or asleep for longer periods. The low-power wake-up radio may be a companion radio to a primary connectivity radio, in various types of wireless devices, for example WLAN STAs, cellular telephones, NAN devices, wireless sensors, and the like. A wireless device, such as a WLAN STA, may comprise both the WLAN primary connectivity radio and a companion low-power wake-up radio. To wake-up the primary connectivity radio (PCR) in the wireless device, a wake-up frame (WUF) is received from a caller device, such as an access node, an access point, a base station, a non-access node, a NAN device, or the like.

The wake-up radio interface may be designed to consume less power than the primary connectivity radio interface. The wake-up radio interface may employ a simpler modulation scheme than the primary connectivity radio interface, for example the wake-up radio interface may use only on-off keying while the primary connectivity radio interface uses variable modulation schemes such as phase-shift keying and quadrature amplitude modulation. The wake-up radio interface may operate on a smaller bandwidth than the smallest operational bandwidth of the primary connectivity radio interface, for example 5 Megahertz (MHz) for the wake-up radio and 20 MHz for the smallest bandwidth of the primary connectivity radio interface.

Since the primary purpose of the wake-up radio interface is to wake up the primary connectivity radio interface, the wake-up radio interface may be powered on when the primary connectivity radio interface is powered off. A wake-up radio interface of the STA may be configured to receive and extract wake-up radio frames transmitted by a wake-up radio interface of another station, for example an access point. The wake-up radio interface of the STA may be capable of decoding the wake-up radio frames on its own without any help from the primary connectivity radio interface. Accordingly, the wake-up radio interface may comprise, in addition to a radio frequency front-end receiver components, digital baseband receiver components and a frame extraction processor capable of decoding contents of a wake-up radio frame. The wake-up radio frame may comprise a destination address field indicating a STA that should wake up the primary connectivity radio interface, and the frame extraction processor may perform decoding of the destination address from a received wake-up radio frame and determine whether or not the destination address is an address of the STA of the frame extraction processor. If yes, it may output a wake-up signal causing the primary connectivity radio interface to wake up for radio communication with an access point.

There have been discussions in the IEEE 802.11ba task group regarding low-power wake-up radio design, wherein each device within range that is a targeted recipient of a wake-up radio frame needs to activate its primary connectivity radio. Potential need for a distance aware wake-up (DAW) operation has been discussed, which may be limited to within a certain distance between an access point transmitting a wake-up radio frame and a STA to which the wake-up radio frame is targeted.

FIG. 1 illustrates an example conceptual drawing depicting distance aware wake-up (DAW) range, in accordance with the invention. A distance aware wake-up mode has been previously set up so that disabled (or sleeping) wireless devices 100 that meet a distance and identity requirement wake-up their primary connectivity radio interface due to receiving a wake-up frame (WUF) from the caller device 102. The WUF may be unicast and directed to the one wireless disabled device to which the address has been assigned and that is within the DAW range. The WUF may be groupcast and directed to all the wireless disabled devices within the group and within the DAW range. The wireless disabled devices may be WLAN STA, cell phone, NAN device, wireless sensor, or the like. The caller device 102 may be an access node, an access point, a base station, a non-access node, a NAN device, or the like. The figure shows a second disabled wireless device 100' within DAW range, but the WUF comprises a WUR identifier (WID) that is not associated to second device 100', and thus it does not wake up its primary connectivity radio interface. The DAW range is typically user and WID specific. Both the WID and the WID-specific DAW conditions need to be met for the device to wake up the PCR. The figure also shows several disabled wireless devices 100" that are not within the DAW range, even though they are within the WUF range.

During the preceding distance aware wake-up mode setup, the wireless device 100 requested the DAW-mode and may have indicated one or more corresponding distance thresholds. The access point 102 responded by transmitting WUR Parameters to the wireless device that carry DAW related information for the WUR setup. The access point 102 assigned a wake-up identifier (WID) to the wireless device 100 that indicates the DAW-mode to be used with the wake-up identifiers (WID). A distance threshold may determine the minimum distance between the access point 102 and the wireless device 100, which needs to be met before the transmitted WUF has an effect. Alternatively or additionally, a distance threshold may determine the upper limit to the distance between the access point 102 and the wireless device 100, after which the WUF has no effect. Multiple distance thresholds may also have been assigned to a WID for which the DAW-mode is requested.

FIG. 2 illustrates an example wireless network showing setup of a distance aware wake-up notification mode between the wireless caller device 102 and the wireless called device 100. The figure includes a functional block diagram of the wireless caller device 102 and a functional block diagram of the wireless called device 100 that includes the primary connectivity radio interface 120 and the companion low-power wake-up radio interface 110.

The wireless called device 100 may be WLAN STA, cell phone, NAN device, wireless sensor, or the like. The caller device 102 may be an access node, an access point, a base station, a non-access node, a NAN device, or the like. If the caller device 102 is a base station, it may be a cellular base station in a wireless telephone macrocell, microcell, picocell, or femtocell network.

In the example embodiment of the invention disclosed herein, the wireless caller device 102 is implemented as an IEEE 802.11 access point and the wireless called device 100 is implemented as an IEEE 802.11 STA. The IEEE 802.11 standard generally describes these components, for example in the IEEE 802.11-2016 standard.

The companion low-power wake-up radio interface 110 of both the caller device or access point 102 and the called device or STA 100 includes a processor 122 that may include at least one of the following: a dual or multi-core central processing unit CPU 124 and 125, a RAM memory 126, a ROM memory 127, an interface for a keypad, display, and other input/output devices, a protocol stack 106, including, for example, a portion of the IEEE 802.11 MAC, for communication over the network in a low power mode. The companion low-power wake-up radio interface 110 includes a low power WLAN transceiver 108 and a wake-up radio application program 104.

The primary connectivity radio interface 120 of both the access point 102 and the STA 100 includes a processor 122 that may include at least one of the following: a dual or multi-core central processing unit CPU 124 and 125, a RAM memory 126, a ROM memory 127, an interface for a keypad, display, and other input/output devices, and a WLAN protocol stack 107, including, for example, the full IEEE 802.11 MAC, for communication over the network in a full power mode. The primary connectivity radio interface 120 includes a full power WLAN transceiver 118 and a primary connectivity radio application program 114.

In an example embodiment, both the caller device or access point 102 and the called device or STA 100 may include at least one processor, at least one memory including computer program code.

Figure 13:
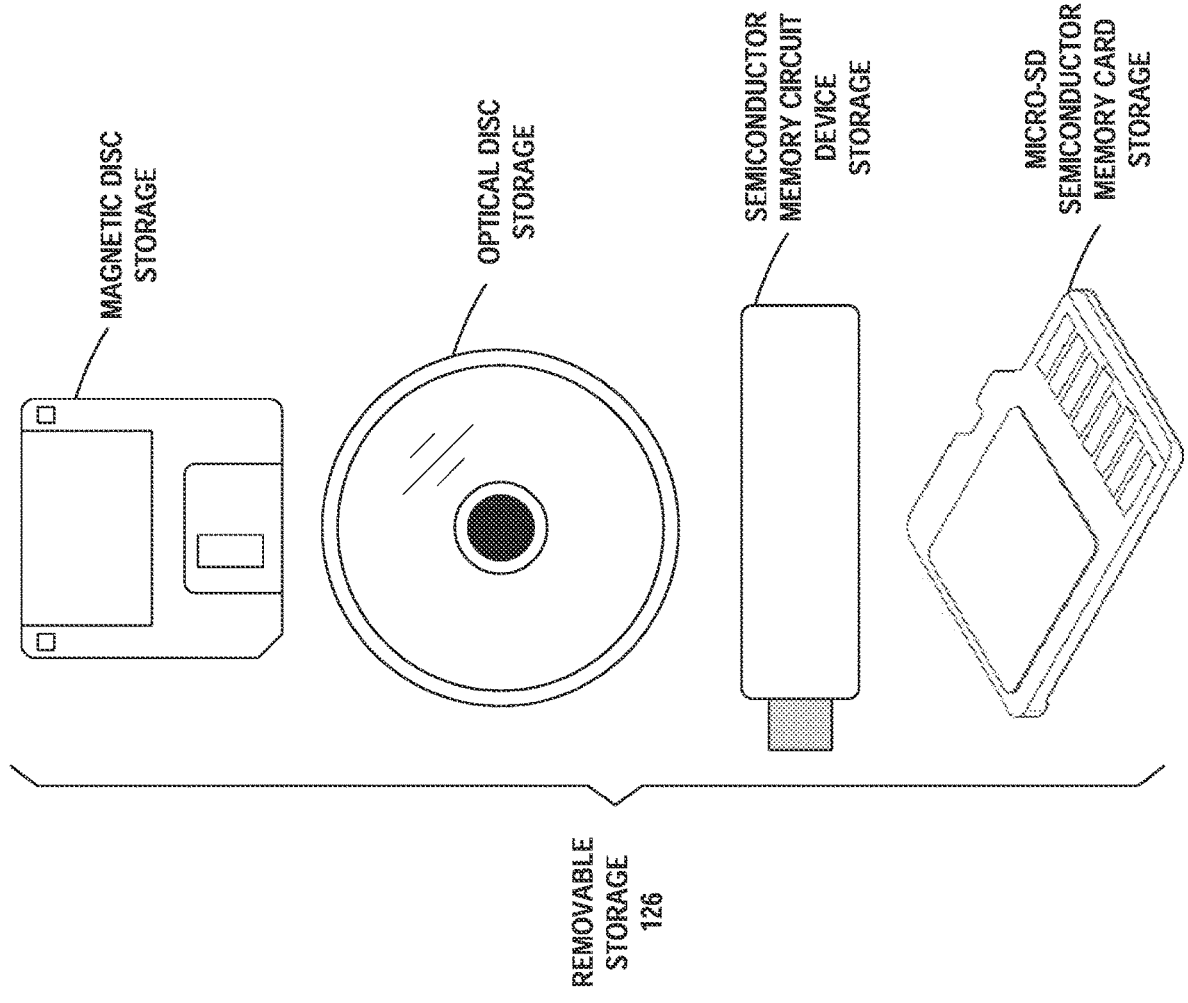
FIG. 13 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with an example embodiment of the invention.

In an example embodiment, both the caller device or access point 102 and the called device or STA 100 may include interface circuits that interface with one or more radio transceivers, battery and other power sources, key pad, touch screen, display, microphone, speakers, ear pieces, camera or other imaging devices, etc. The RAM and ROM may be removable memory devices 126 such as smart cards, SIMs, WIMs, semiconductor memories such as RAM, ROM, PROMS, flash memory devices, etc. The processor protocol stack layers, and/or application program may be embodied as program logic stored in the RAM and/or ROM in the form of sequences of programmed instructions which, when executed in the CPU, carry out the functions of example embodiments. The program logic may be delivered to the writeable RAM, PROMS, flash memory devices, etc. from a computer program product or article of manufacture in the form of computer-usable media such as resident memory devices, smart cards or other removable memory devices. Alternately, they may be embodied as integrated circuit logic in the form of programmed logic arrays or custom designed application specific integrated circuits (ASIC). The one or more radios in the device may be separate transceiver circuits or alternately, the one or more radios may be a single RF module capable of handling one or multiple channels in a high speed, time and frequency multiplexed manner in response to the processor. An example of removable storage media 126, as shown in FIG. 13, may be based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

In the setup of a distance aware wake-up notification mode in FIG. 2, the primary connectivity radio 120 of the STA 100 transmits a wireless wake-up radio configuration request message 130 to the associated wireless access point 102, requesting setup of a distance aware wake-up notification mode to enable the companion low-power wake-up radio 110 of the STA, to wake-up the primary connectivity radio 120 when it is disabled, in response to the low-power wake-up radio 110 receiving a wake-up frame 140 from the access point 102, as shown in FIG. 3.

The access point 102 measures a received signal strength of the wireless wake-up radio configuration request message 130, estimates path loss between the primary connectivity radio 120 of the STA and the access point 102, and estimates a current distance between the primary connectivity radio of the STA and the access point 102 based on the path loss estimate.

In response, the access point 102 transmits to the primary connectivity radio 120 of the STA, a wireless wake-up configuration response message 132 comprising a wake-up identifier (WID) for the distance aware wake-up notification mode and an offset value for use with wake-up frames 140 (shown on FIG. 3) that are to be identified in the distance aware wake-up notification mode.

In further response, the wireless access point 102 transmits to the companion low-power wake-up radio 110 of the STA, a wireless wake-up radio measurement reference message 134 transmitted at a transmit power equal to a reference level value plus the offset value plus the estimated path loss.

The wake-up radio configuration request message 130 may comprise a requested distance and the wake-up radio configuration response message 132 may comprise an offset value that is based on the requested distance. The reference level value may be based, at least partly, on the receive signal strength of the wireless wake-up radio measurement reference message 134 and on the offset value.

The companion low-power wake-up radio 110 of the STA measures a receive signal strength of the wireless wake-up radio measurement reference message 134, setting as a reference level value the receive signal strength of the wireless wake-up radio measurement reference message 134 plus the offset value, and associating the reference level value with the wake-up identifier (WID) for the distance aware wake-up notification mode.

FIG. 3 illustrates the example wireless network of FIG. 2, showing transmission by the caller device or access point 102 of a wake-up frame (WUF) 140 in the distance aware wake-up notification mode, to the companion low-power wake-up radio 110 of the called device or STA 100, to wake-up the primary connectivity radio 120 of the STA. The wake-up frame 140 includes the wake-up identifier (WID) for the distance aware wake-up notification mode, thereby enabling the companion low-power wake-up radio 110 of the STA to wake-up the primary connectivity radio 120 of the STA, if a receive signal strength of the wireless wake-up frame 140 measured by the companion low-power wake-up radio 110 of the STA, is above the reference level value.

Figure 4:
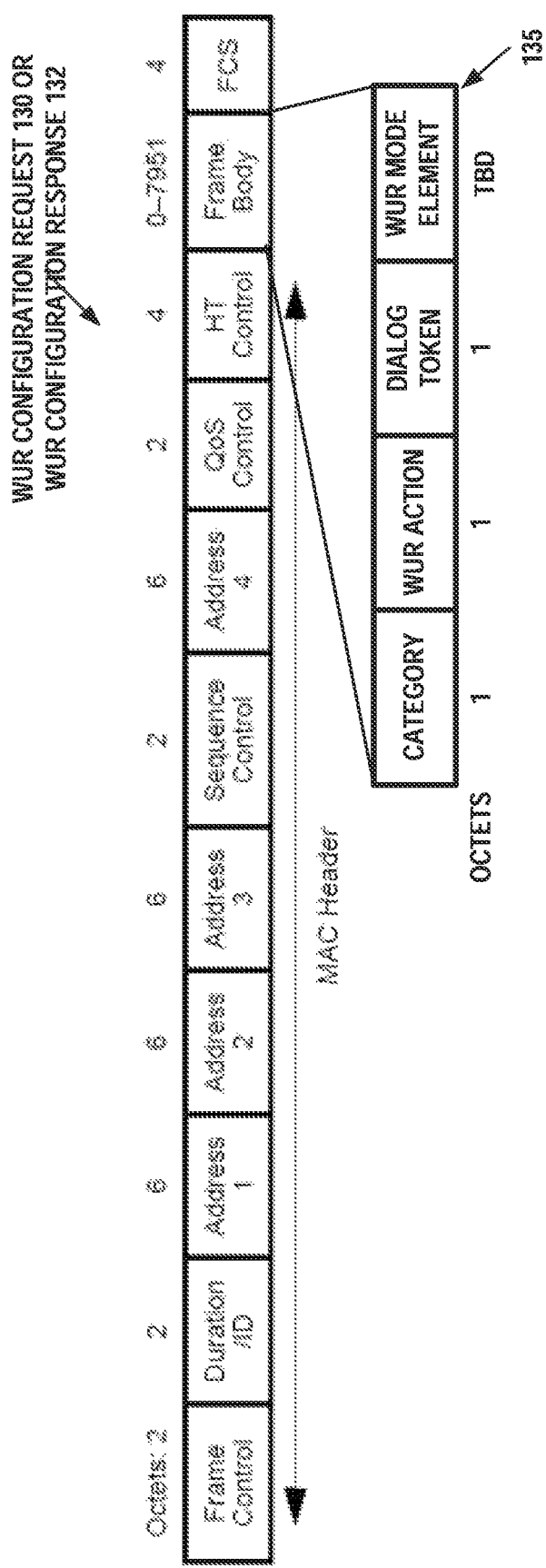
FIG. 4 illustrates an example wake-up radio (WUR) Action frame format.

FIG. 4 illustrates an example wake-up radio (WUR) Action frame format. The IEEE 802.11 standard generally describes action frames, for example in the IEEE 802.11-2016 standard. In the setup of WUR to operate in DAW mode, the preferred implementation is to extend the WUR configuration/setup procedure that has been proposed to build on exchange of action frame based messages. The general action frame format with the WUR specific Frame Body is shown in FIG. 4. The "WUR Action" field has a value to indicate if the frame is a WUR Configuration Request 130 or a WUR Configuration Response 132. The proposed WUR Mode Element 135 format is shown in FIG. 5.

Figure 5:
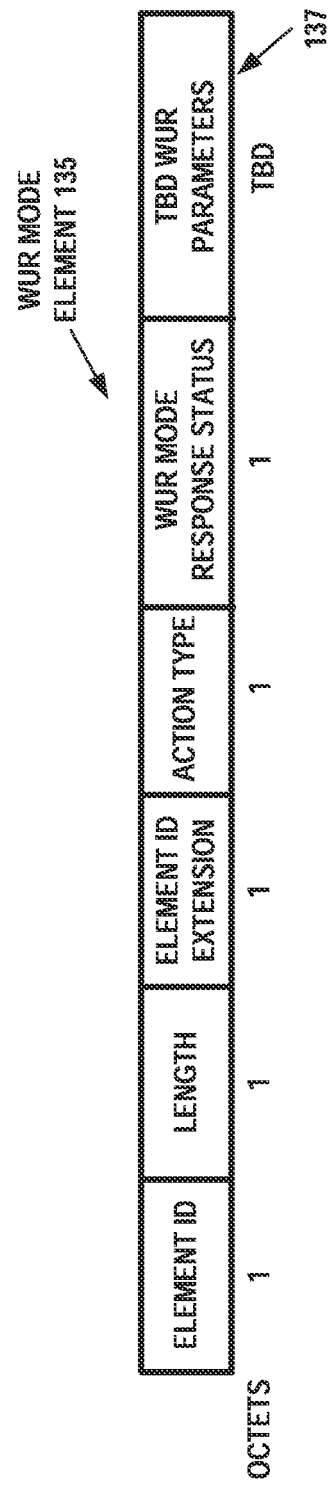
FIG. 5 illustrates an example wake-up radio (WUR) Mode Element format.

FIG. 5 illustrates an example wake-up radio (WUR) Mode Element 135 format in the action frame of FIG. 4. In the preferred implementation, the TBD WUR Parameters field 137 is used to carry DAW related information in addition to other WUR setup and configuration parameters. The field is expected to be variable in size and its size depends on the parameters carried in the request. The request frame 130 and the WUR Mode Element 135 within are used to indicate whether the STA 100 requests DAW-mode to be used with any of the requested wake-up identifiers (WIDs). If the DAW-mode is requested for one or more of the requested WIDs, the STA needs to indicate also the corresponding distance thresholds. A distance threshold may determine the minimum distance between the AP 102 and the STA 100, which needs to be met before the transmitted WUF 140 has an effect. Alternatively, a distance threshold may determine the upper limit to the distance between the AP 102 and the STA 100 after which the WUF 140 has no effect. Multiple distance thresholds may be also assigned to a WID for which the DAW-mode is requested. One implementation example is to have the following sub-fields in the WUR Parameters field 137:

WID-type sub-field
  This is part of prior art and thus not really part of the invention even though this type of information is needed for the next sub-field to be relevant.
  With this sub-field, the STA indicates the type of one or more wake-up identifiers that it requests from the AP.
  The WID may be of the following type: unicast, groupcast, or broadcast.
DAW-mode sub-field
  With this sub-field, the STA indicates whether the STA requests the DAW-mode be used with the requested WID-type.
  One may request a WID with or without the DAW-mode.
Wake-up Distance sub-field
  With this sub-field, the STA indicates one or more distance thresholds e.g. in meters. For each threshold, one indicates also whether the threshold is the minimum distance or the maximum distance. Each WID may have its own distance parameter or one may apply one distance threshold setting for multiple/all WIDs.
  Example: (WID-type: Unicast, DAW-mode: ON, Distance: {2 m/max})

Once an AP receives from a STA a WUR Configuration Request frame 130 in which at least one WID is requested with the DAW-mode on, the AP takes actions to set a required number of reference signal levels for the STA to use in WUR. Each reference signal level is the signal level in WUR interface 110 which is deemed to represent one of the distance thresholds requested by the STA. In an example embodiment, there is only one distance threshold and one reference signal level. In alternate example embodiments, there are as many reference levels as there are distance thresholds. Additionally, the AP prepares a WUR Configuration Response frame 132 for transmission to the STA and transmits the frame 132 to the STA.

Figure 6:
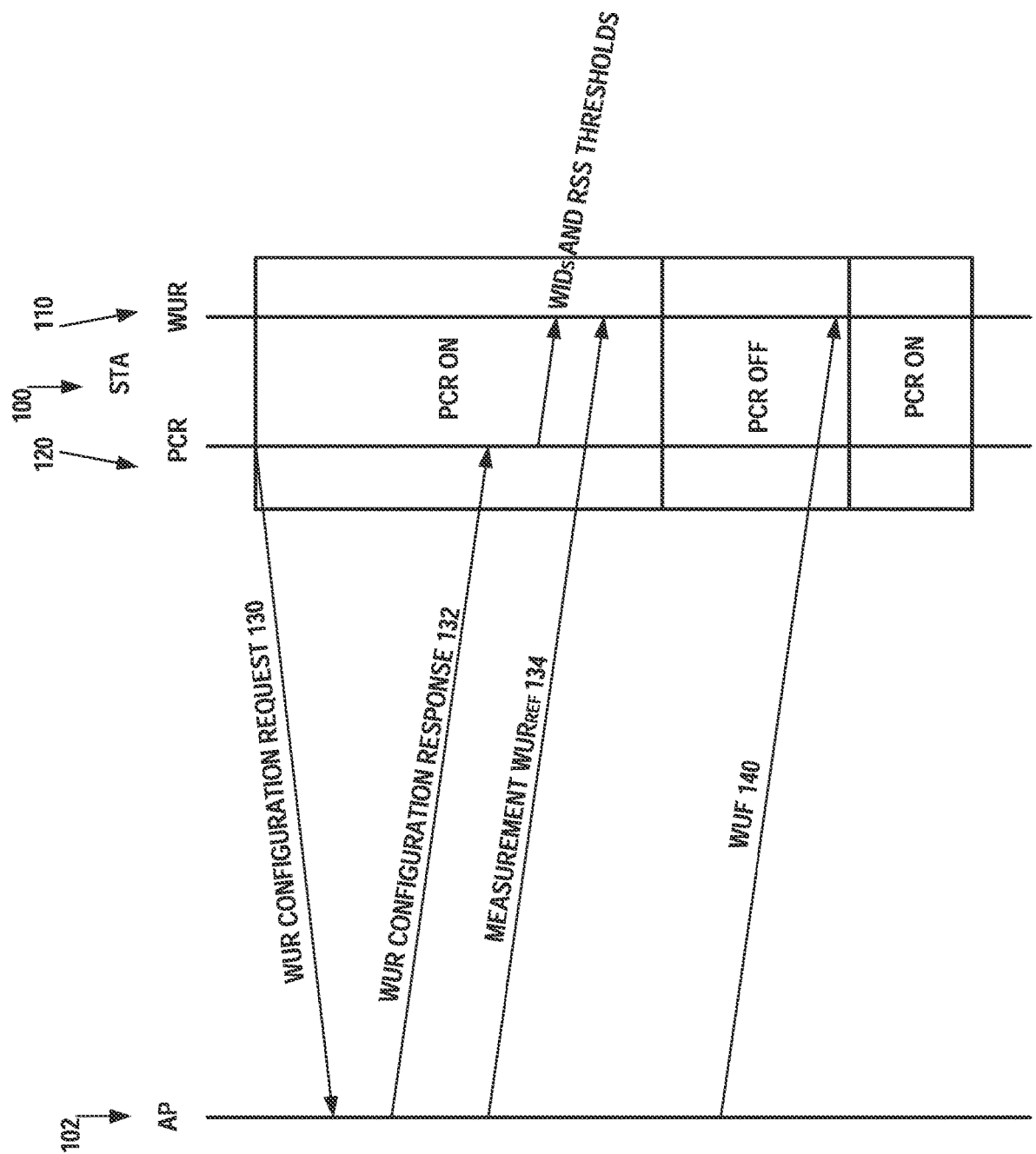
FIG. 6 illustrates an example sequence flow of wake-up radio (WUR) configuration with distance aware wake-up (DAW).
Figure 7:
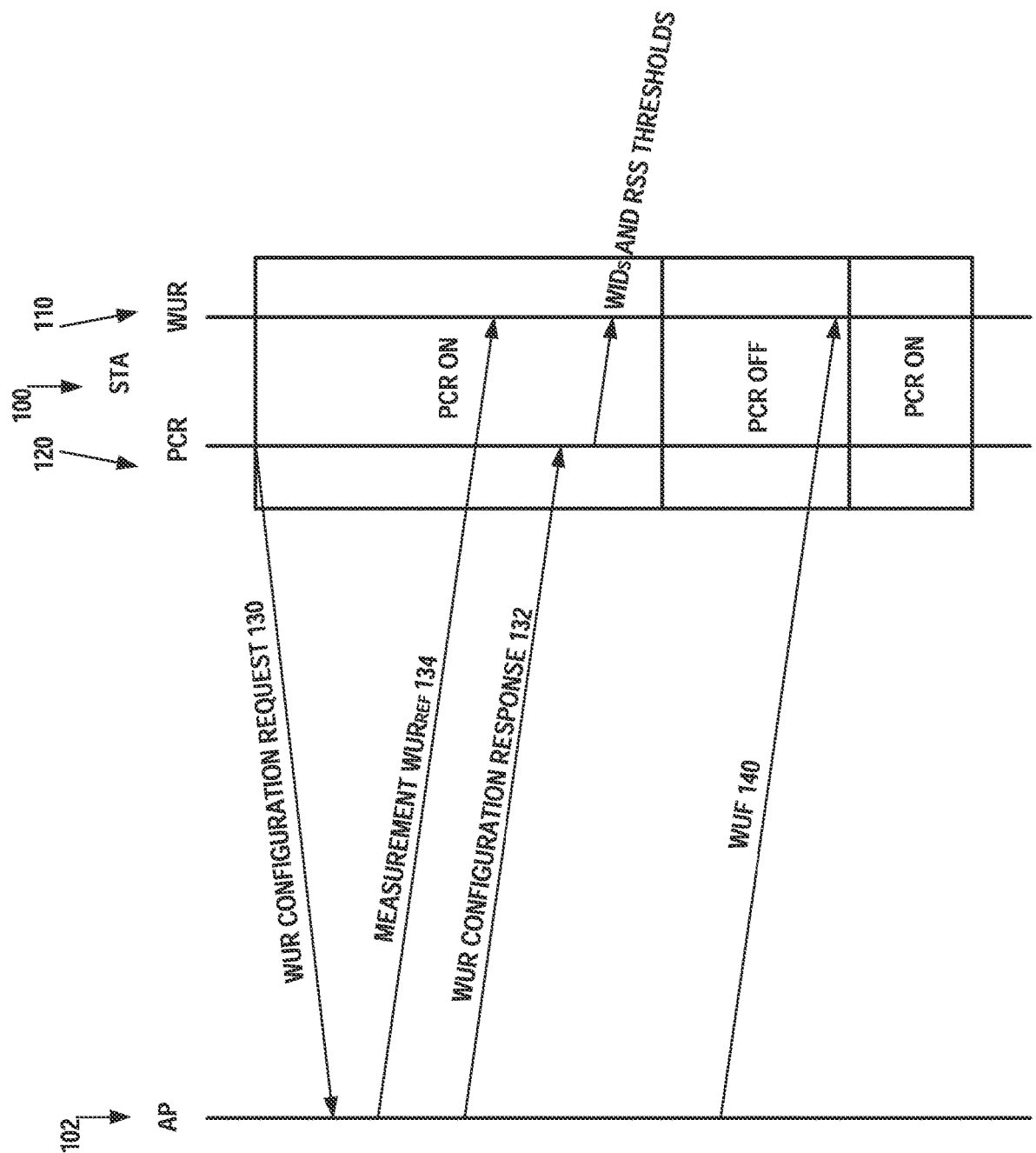
FIG. 7 illustrates an alternative example sequence flow of wake-up radio (WUR) configuration with distance aware wake-up (DAW). In this embodiment the STA's Unicast wake-up identifier (WID) is known before the wake-up radio (WUR) Configuration Response.

The basic idea in the use and setting of the reference signal level is to provide basis for a STA to estimate whether a received WUF 140 meets the distance criteria. The STA compares signal level of each WUF 140 targeted to it with a WID with the DAW-mode on to the reference signal level. If the distance threshold is set, as an example, to wake-up the STA at any time when a WUF 140 targeted to the STA is received from the AP no more than 2 meters from the STA, the reference signal level determines the minimum signal level for a received WUF 140 that wakes up the STA's PCR 120. On the other hand, if a minimum distance threshold is set, the reference signal level determines an upper limit for the signal level of a received WUF 140 that wakes up the STA's PCR 120. The AP sets the reference signal level by transmitting a specific WUR frame (Measurement $WUR_{REF}$) 134, as illustrated in FIG. 6 and FIG. 7. The Measurement $WUR_{REF}$ 134 may be a WUR frame of a specific type and its type may be indicated with the sub-field in the WUR frame MAC Header that is used to indicate, as an example, whether the frame is a WUR Beacon, a WUR Discovery frame, or a Wake-Up frame 140. Alternatively, the Measurement WUR$_{REF}$ frame 134 may be indicated with a dedicated WID which may be either pre-defined or allocated by the AP. In the latter case, the WID used with the Measurement WUR$_{REF}$ frame 134 may be indicated with the WUR Configuration Response 132. This approach is possible in the approach illustrated in FIG. 6, while the former approach of pre-defined WID(s) is illustrated in FIG. 7.

The reference signal level may be set directly with the Measurement WUR$_{REF}$ frame 134, e.g. the reference signal level may be set to a received signal strength of the Measurement WUR$_{REF}$ frame, or as a combination of the received signal strength of the Measurement WUR$_{REF}$ frame 134 and an offset value communicated by the AP to the STA. If the Measurement WUR$_{REF}$ 134 directly sets the reference signal level, the STA relates all the subsequent WUFs 140 targeted to it to the received signal level of the Measurement WUR$_{REF}$ frame 134. If the Measurement WUR$_{REF}$ 134 sets the reference signal level together with an offset value, the reference signal level is determined as follows:

$$\text{Reference\_signal\_level} = \text{received\_signal\_level}(\text{Measurement WUR}_{REF}) + \text{offset}$$

The offset is an integer or a real value in decibels and the AP may use it to set the reference signal level to a level different from the received signal level of the Measurement WUR$_{REF}$ frame 134. This is a preferable approach if the AP, as an example, has no means to settle the reference signal level by adjusting the transmit power of the Measurement WUR$_{REF}$ frame 134. The AP just needs to estimate the signal level of the Measurement WUR$_{REF}$ frame 134 at the STA receiver with the planned transmit power and calculate the offset value required for the desired reference signal level. In fact, the approach in which the reference signal level is set directly with the Measurement WUR$_{REF}$ frame 134 also uses the equation above with the offset always set to '0'. Then the AP may have an effect on the reference signal level only through WUR transmit power adjustments.

The wake-up radio configuration request message 130 may comprise a requested distance and the wake-up radio configuration response message 132 may comprise an offset value that is based on the requested distance. The reference level value may be based, at least partly, on the receive signal strength of the wireless wake-up radio measurement reference message 134 and on the offset value.

Should the AP communicate the offset to the STA, it may use, as an example, WUR Configuration Response frame 132 or the Measurement WUR$_{REF}$ frame 134. The preferred approach is to use the WUR Configuration Response frame 132 described in detail in the following.

WUR Configuration Response 132 (transmitted by the AP to the STA through Primary Connectivity Radio 120 as a response to the request 130 received earlier from the STA) includes parameters, such as:

WID sub-field
One or more WIDs as requested.
The AP may indicate also the WID assigned by the AP to the Measurement WUR$_{REF}$ frames with this sub-field.
WID-type sub-field
As an example, a bit-map which indicates whether the provided WID is a unicast, groupcast, or broadcast identifier.
This bit-map may be used to indicate also that a WID is assigned to the Measurement WUR$_{REF}$ frames. Alternatively,
DAW-mode sub-field
A bit-map, as an example, which indicates whether the provided WID is used with or without the DAW-mode.
Offset sub-field
One offset value for each WID which is use with the DAW-mode.
Not present if the reference signal level is determined directly by the received signal level of Measurement WUR$_{REF}$ frame.
Example: (WID: <address>, Type: Unicast, DAW-mode: ON, Offset: {10})

With the preferred approach the AP transmits a WUR Configuration Response 132 before a Measurement WUR$_{REF}$ frame 134. The AP may then signal all the reference signal level and Measurement WUR$_{REF}$ frame transmission related parameters before transmitting the Measurement WUR$_{REF}$ frame 134. As an example, the WID used with the Measurement WUR$_{REF}$ frame 134 as well as the possible offset values are communicated to the STA prior to the Measurement WUR$_{REF}$ frame 134 transmission, which makes procedure implementation easier. In the preferred approach, there is a dedicated frame type for Measurement WUR$_{REF}$ frames 134 and for each WID which is established to operate with the DAW-mode on, a Measurement WUR$_{REF}$ frame 134 is transmitted with the established WID. In other words, no separate or dedicated WID is used with Measurement WUR$_{REF}$ frames 134, but the WID is the one to which the DAW-mode is associated.

In the alternative approach, the Measurement WUR$_{REF}$ frame 134 is transmitted before the WUR Configuration Response 132. In this case, a pre-defined WID needs to be used with the Measurement WUR$_{REF}$ frame 134 and the STA needs to determine the reference signal level in phases, first steps taken upon reception of the Measurement WUR$_{REF}$ frame 134 and final steps once the WUR Configuration Response frame 132 has been received.

The two approaches are illustrated in FIG. 6 and FIG. 7 with the former one being the preferable solution.

FIG. 6 illustrates an example sequence flow of wake-up radio (WUR) configuration with distance aware wake-up (DAW). With the preferred approach of FIG. 6, when a STA, which has transmitted earlier a WUR Configuration Request frame 130 requesting at least one WID with the DAW-mode on, receives a WUR Configuration Response 132, the STA prepares itself for reference signal level setting. Once it receives a Measurement WUR$_{REF}$ frame 134 targeted to it from the AP, it determines the reference signal level for each of the distance thresholds using the signal level of the received Measurement WUR$_{REF}$ frame 134 and the possible offset values indicated in the WUR Configuration Response 132. Once the STA has determined the reference signal levels for the WIDs that are operated with the DAW-mode on, it may start using the levels in the WUR for any WUFs 140 addressed with the WIDs to determine whether the PCR should be woken up or not. More on that next.

FIG. 7 illustrates an alternative example sequence flow of wake-up radio (WUR) configuration with distance aware wake-up (DAW). In this embodiment the STA's Unicast wake-up identifier (WID) is known before the wake-up radio (WUR) Configuration Response 132.

The operation of the WUR interface in the DAW-mode is based on the above described modifications to the WUR operation when the DAW-mode has been set up.

Wake-Up Frame Format:

In the preferred embodiment, the DAW-mode is coupled with a WID. In that case, WUF 140 does not need additional MAC header field to indicate to STA usage of the DAW-mode.

Figure 8:
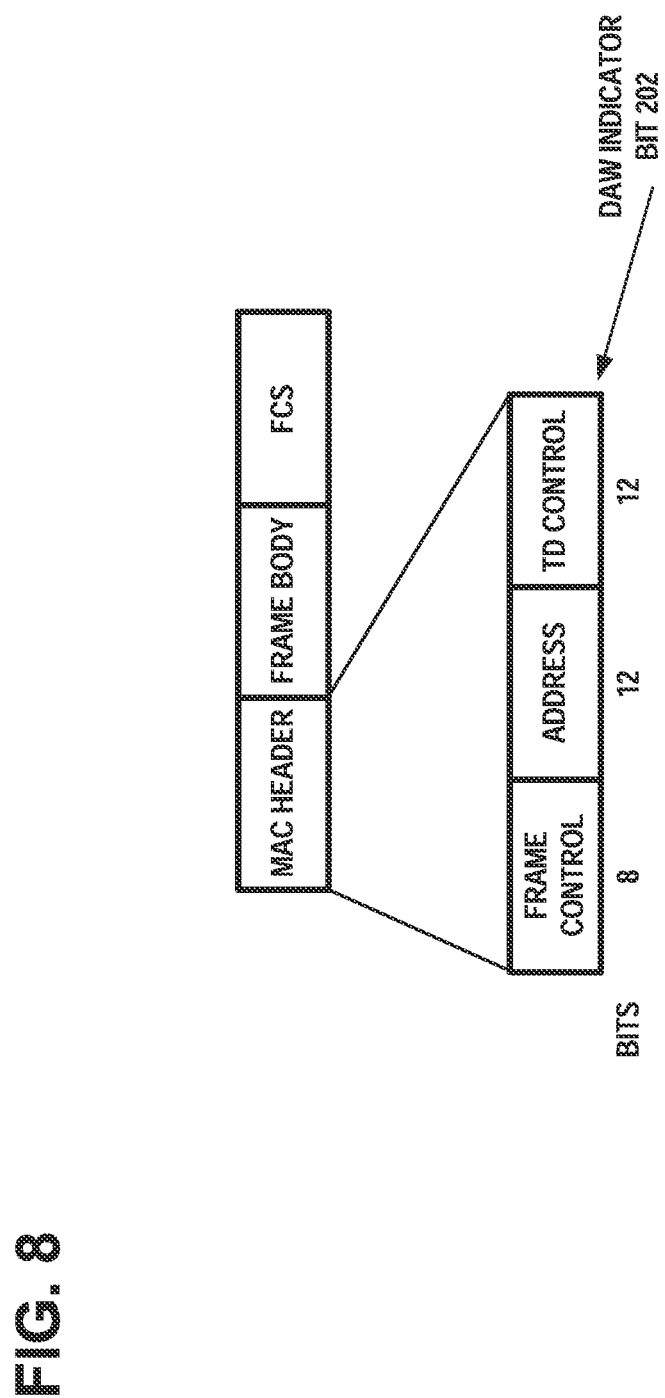
FIG. 8 illustrates an example wake-up radio (WUR) MAC frame format.

Alternatively, use of the DAW-mode is not tied to WID, but each WUF 140 has a sub-field, e.g. one bit, to indicate whether the DAW-mode needs to be applied to the WUF 140. The 802.11ba WUF frame 140 format as described in the 802.11ba specification framework document is shown in FIG. 8. Such a sub-field may be implemented, as an example, as a DAW-bit which could be added to TD (type dependent) Control as a DAW indicator bit 202 of the MAC frame format. The IEEE 802.11 standard generally describes MAC frames, for example in the IEEE 802.11-2016 standard.

WUF Transmission:

In a typical WUR scenario shown in FIG. 3, the AP uses rules defined in 802.11ba to transmit a WUF 140. In one embodiment, the AP operating in DAW mode may adjust transmit power in WUF 140 transmission to change effective wake-up distance without configuring DAW parameters.

WUF Reception:

When receiving a WUF 140 shown in FIG. 3, the STA checks network id and receiver address (WID) and considers only WUFs 140 addressed to it. In one embodiment, each WID is coupled with usage of DAW-mode. In case the WID is one to use DAW mode, i.e. WIDDAW, the STA shall consider whether the distance criteria set to the WID are met. If they are met, the PCR 120 is woken up. The STA compares the signal level of the received WUF 140 to all the reference signal levels it has for the WID. There may be multiple distance ranges and one or more min-max pairs and it is enough to have the signal level between one of those reference signal level pairs. If one or more of the reference signal level comparisons fail, the distance criteria have not been met.

If the DAW-mode usage is not coupled with the WID, but there is a sub-field in the WUF 140 indicating whether the DAW-mode is used, the operations are otherwise as described above, but the STA uses the DAW-mode sub-field value to determine whether reference signal level comparison should be done to determine whether the PCR 120 should be activated.

Figure 9:
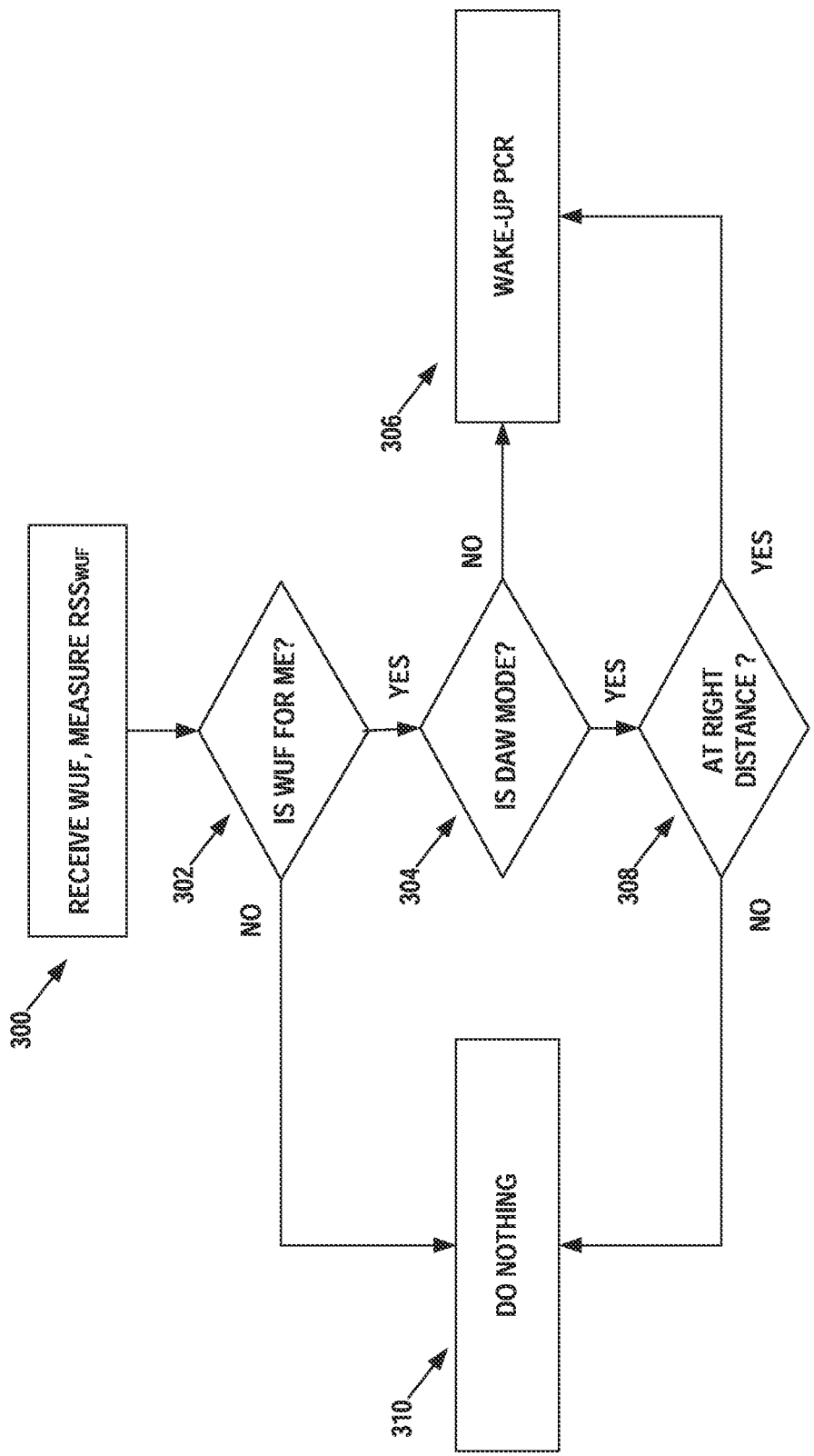
FIG. 9 illustrates an example wake-up radio (WUR) operation with DAW.

FIG. 9 illustrates an example flow diagram of the wake-up radio (WUR) operation of the wireless device 100 with DAW. In an embodiment, all the steps are part of the implementation of the wireless device. In another embodiments, one or more of the steps may be optional. It is also possible that some steps are performed in a different order. For example, it may be possoble to first perform step 304 and then step 302.

Step 300: Receive WUF 140 and measure the RSS of WUF.

Step 302: Determine "Is WUF for me?" If step 302 is "Yes", then go to 304, else 310.

Step 304: Determine "Is DAW mode?" If step 304 is "Yes", then go to step 308 else 306.

Step 306: Wake up PCR 120.

Step 308: Determine "At right distance?" If 308 is "Yes", then go to step 306 else 310.

Step 310: Do nothing.

Figure 10:
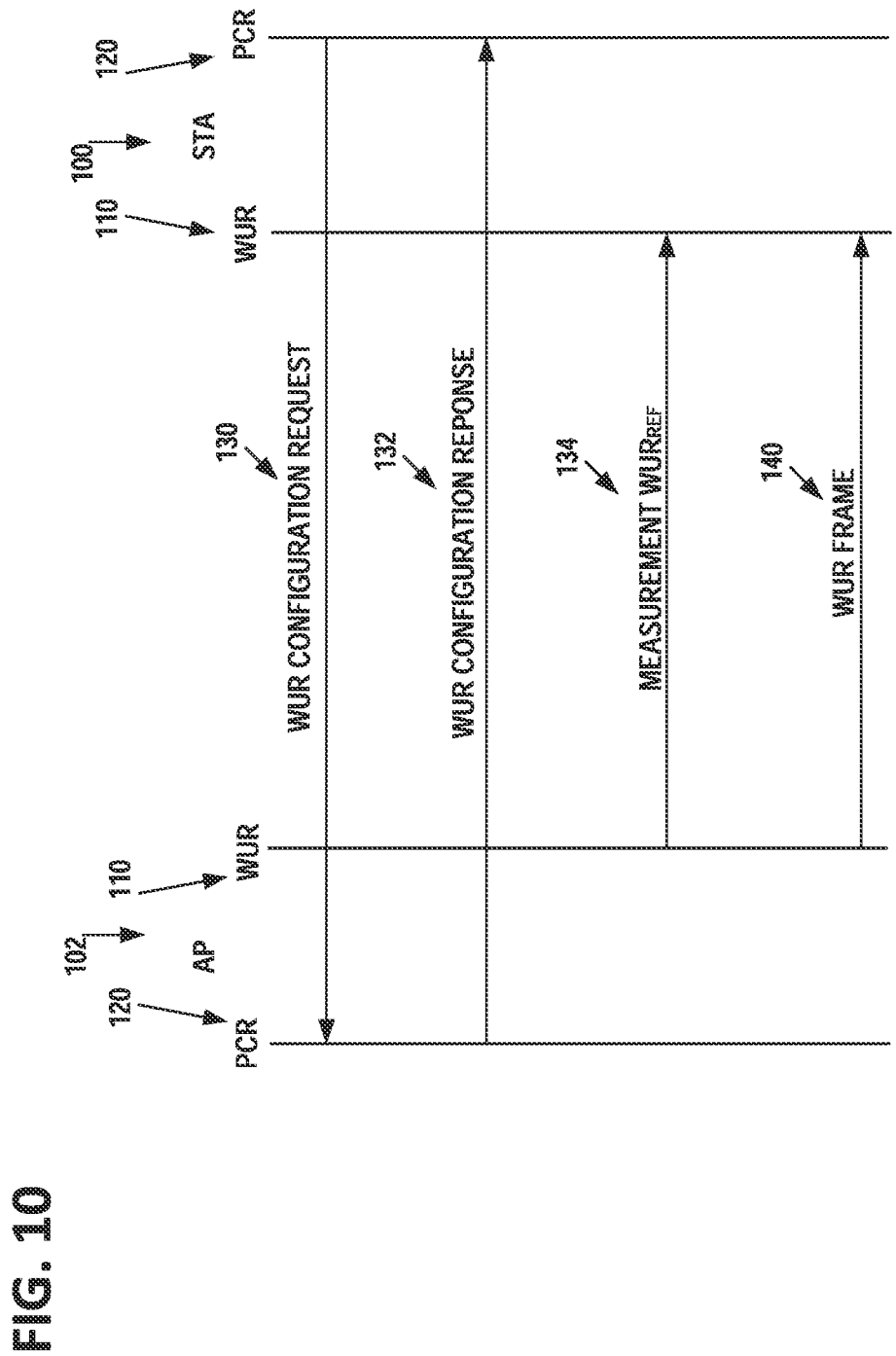
FIG. 10 illustrates an example wake-up radio (WUR) sequence diagram with distance aware wake-up (DAW).

FIG. 10 illustrates an example wake-up radio (WUR) sequence diagram with distance aware wake-up (DAW). In the setup of a distance aware wake-up notification mode, the primary connectivity radio 120 of the wireless device or STA 100 transmits a wireless wake-up radio configuration request message 130 to the associated wireless access point 102, requesting setup of a distance aware wake-up notification mode to enable the companion low-power wake-up radio 110 of the STA, to wake-up the primary connectivity radio 120 when it is disabled or sleeping, in response to the low-power wake-up radio 110 receiving a wake-up frame 140 from the access point 102, as shown in FIG. 3. If the DAW-mode is requested, the STA 100 may indicate the one or more distance thresholds in the wake-up radio configuration request message 130.

The access point (AP) 102 may measure a received signal strength of the wireless wake-up radio configuration request message 130. The access point 102 may estimate path loss between the primary connectivity radio 120 of the STA 100 and the access point 102. The access point 102 may estimate a current distance between the primary connectivity radio of the STA 100 and the access point 102 based on the path loss estimate. The access point 102 may measure the received signal strength (RSS) of the WUR Configuration Request: $RSS_{PCR}$. The access point 102 may estimate the path loss PL between the STA 100 and the access point 102 from the $RSS_{PCR}$, e.g. based on a default Tx power of +15 dBm or based on a Tx power communicated in the wake-up radio configuration request message 130: $PL=TX\_P-RSS_{PCR}$. The access point 102 may estimate the STA-to-AP distance, for example, based on the path loss estimate. In alternative or complementary embodiment, the access point 102 may estimate the distance based on e.g. 802.11 fine timing measurements run over the primary connectivity radio 120.

In response to receiving the wireless wake-up radio configuration request message 130, the access point 102 transmits to the primary connectivity radio 120 of the STA 100, a wireless wake-up configuration response message 132. The wake-up configuration response message 132 may comprise a wake-up identifier (WID) for the distance aware wake-up notification mode. The wake-up configuration response message 132 may comprise an offset value for use with wake-up frames 140 (shown on FIG. 3) that are to be identified in the distance aware wake-up notification mode. The access point 102 may decide whether to use the reference offset and then communicate the offset value to the STA 100 in the wake-up configuration response message 132. The STA 100 may adopt the WID and/or the offset for use with the WUFs that are used with distance based thresholding. The decision on offset use may be related to the STA's ability to estimate RSS' on different receive signal levels. The STA 100 may be capable of estimating received signal level accurately enough within a small signal level window and by applying the offset, one may set the threshold level to be outside the window. Relative signal level measurements may be more accurate with relatively simple and low cost implementations. The STA 100 prepares itself to receive a measurement WUR frame 134 with a given WID.

In further response, the wireless access point 102 transmits to the companion low-power wake-up radio 110 of the STA 100, a wireless wake-up radio measurement reference message 134. The wireless wake-up radio measurement reference message 134 may be transmitted at a transmit power equal to a reference level value plus the offset value plus the estimated path loss. In other embodiments, the transmission power may be fixed. The access point 102 may estimate the WUR signal threshold level (Ref_level) that corresponds to the distance threshold indicated in the wake-up radio configuration request message 130. The access point 102 may decide Tx power for the wake-up radio measurement reference message 134: $Tx\_P=Ref\_level-offset+PL$.

The companion low-power wake-up radio 110 of the STA measures a receive signal strength of the wireless wake-up radio measurement reference message 134. The STA 100 may set as a reference level value based on the receive signal strength of the wireless wake-up radio measurement reference message 134 and optimally based on the offset value. The STA 100 may associate the reference level value with the wake-up identifier (WID) for the distance aware wake-up notification mode. The STA 100 may measure a receive signal strength RSS' of the wake-up radio measurement reference message 134 ($RSS_{WUR\_REF}$). The STA may set that as the reference for the WUF distance thresholding together with the offset provided in the wake-up configuration response message 132. Ref_level=RSS'+offset. The RSS' accuracy is not critical as long as estimates from one WUR frame 140 to another are consistent.

Once the access point 102 wishes to wake up the STA 100, the access point 102 transmits a wake-up frame (WUF) 140 in the distance aware wake-up notification mode, to the companion low-power wake-up radio 110 of the STA, to wake-up the primary connectivity radio 120 of the STA. The wake-up frame 140 includes the wake-up identifier (WID) for the distance aware wake-up notification mode, thereby enabling the companion low-power wake-up radio 110 of the STA to wake-up the primary connectivity radio 120 of the STA, if a receive signal strength of the wireless wake-up frame 140 measured by the companion low-power wake-up radio 110 of the STA, compares with the reference level value. The STA 100 may estimate whether the WUF 140 addressed to it is received at a level high enough (wake up if closer than . . . ) or at a level low enough (wake up if further away than . . . ). The receive signal strength of the wireless wake-up frame 140 is compared against the threshold level(s) set by the wake-up radio measurement reference message 134.

Figure 11:
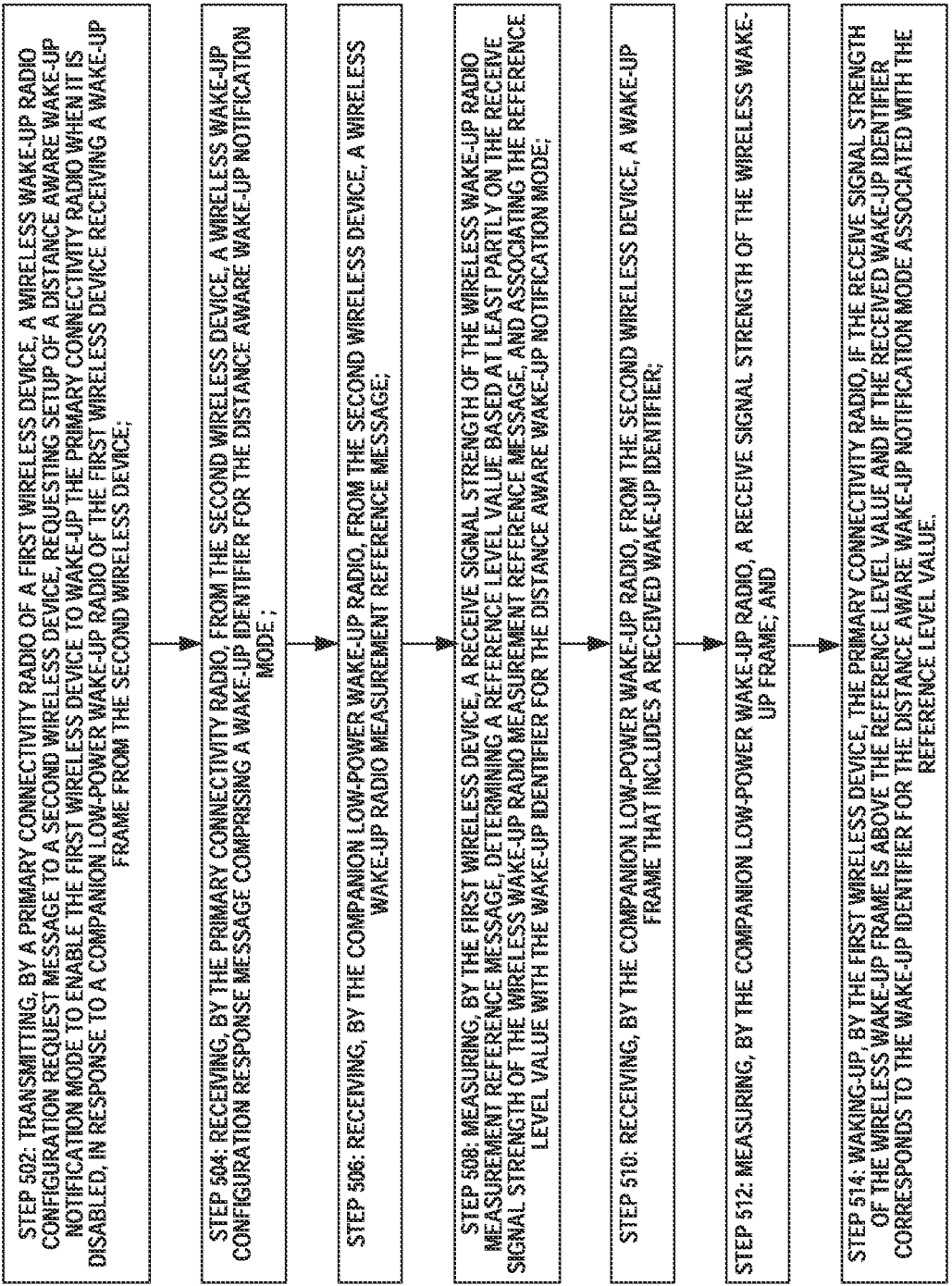
FIG. 11 illustrates an example flow diagram 500 of operational steps in the wireless called device that includes the primary connectivity radio and the low-power wake-up radio, in accordance with at least one embodiment of the present invention.

FIG. 11 illustrates an example flow diagram 500 of operational steps in the called device or STA 100 that includes the primary connectivity radio and the low-power wake-up radio, in accordance with at least one embodiment of the present invention. The steps of the flow diagram represent computer code instructions stored in the device's RAM and/or ROM memory, which when executed by the device's central processing units, carry out the functions of the example embodiments of the invention. The steps may be carried out in another order than shown and individual steps may be combined or separated into component steps. In some embodiments, one or more steps may be optional. The flow diagram has the following steps:

Step 502: transmitting, by a primary connectivity radio of a first wireless device, a wireless wake-up radio configuration request message to a second wireless device, requesting setup of a distance aware wake-up notification mode to enable the first wireless device to wake-up the primary connectivity radio when it is disabled, in response to a companion low-power wake-up radio of the first wireless device receiving a wake-up frame from the second wireless device;

Step 504: receiving, by the primary connectivity radio, from the second wireless device, a wireless wake-up configuration response message comprising a wake-up identifier for the distance aware wake-up notification mode;

Step 506: receiving, by the companion low-power wake-up radio, from the second wireless device, a wireless wake-up radio measurement reference message;

Step 508: measuring, by the first wireless device, a receive signal strength of the wireless wake-up radio measurement reference message, determining a reference level value based at least partly on the receive signal strength of the wireless wake-up radio measurement reference message, and associating the reference level value with the wake-up identifier for the distance aware wake-up notification mode;

Step 510: receiving, by the companion low-power wake-up radio, from the second wireless device, a wake-up frame that includes a received wake-up identifier;

Step 512: measuring, by the companion low-power wake-up radio, a receive signal strength of the wireless wake-up frame; and Step 514: waking-up, by the first wireless device, the primary connectivity radio, if the receive signal strength of the wireless wake-up frame is above the reference level value and if the received wake-up identifier corresponds to the wake-up identifier for the distance aware wake-up notification mode associated with the reference level value.

Figure 12:
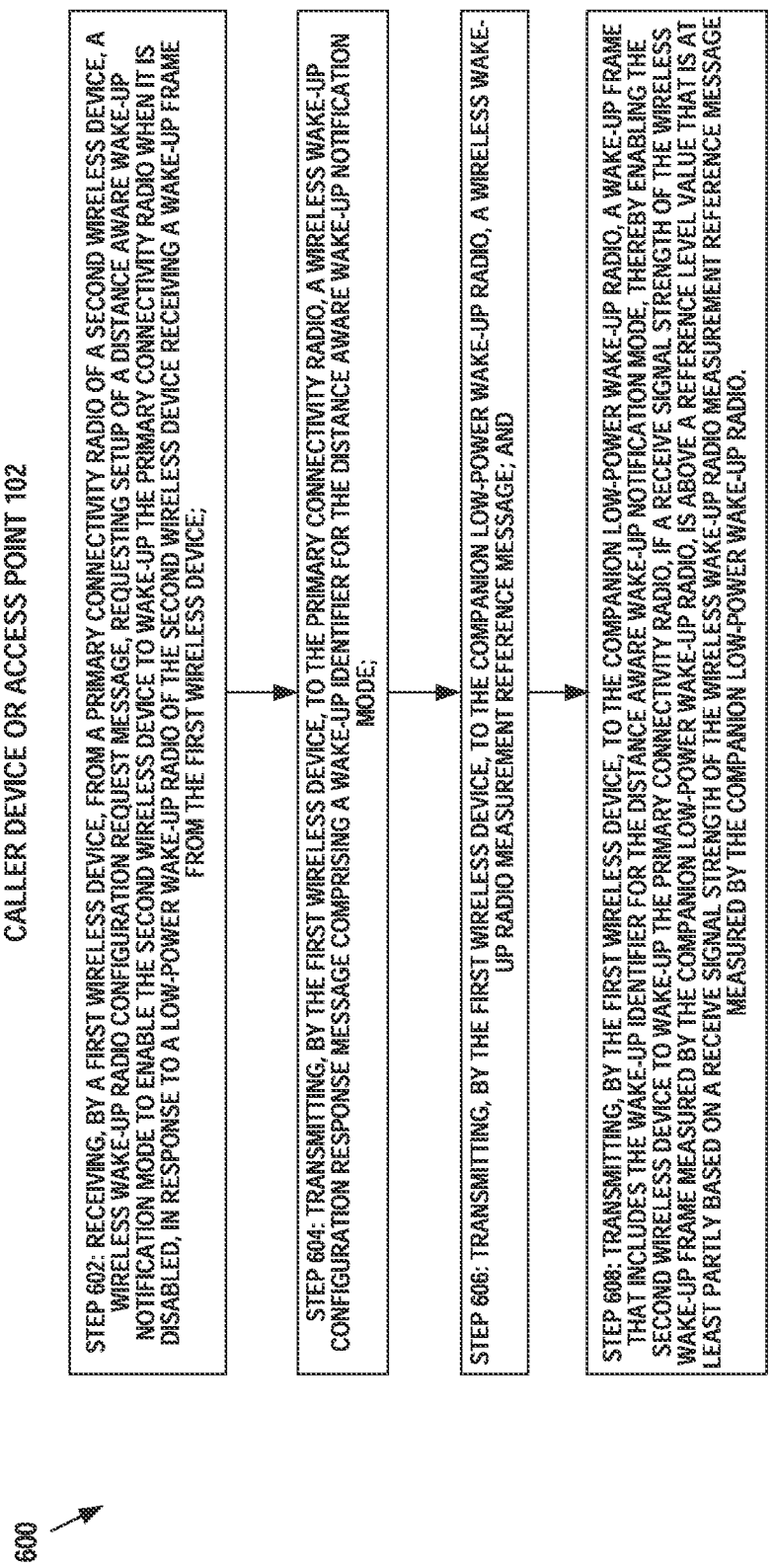
FIG. 12 illustrates an example flow diagram 600 of operational steps in the wireless caller device, in accordance with at least one embodiment of the present invention.

FIG. 12 illustrates an example flow diagram 600 of operational steps in the caller device or access point 102, in accordance with at least one embodiment of the present invention. The steps of the flow diagram represent computer code instructions stored in the device's RAM and/or ROM memory, which when executed by the device's central processing units, carry out the functions of the example embodiments of the invention. The steps may be carried out in another order than shown and individual steps may be combined or separated into component steps. In some embodiments, one or more steps may be optional. The flow diagram has the following steps:

Step 602: receiving, by a first wireless device, from a primary connectivity radio of a second wireless device, a wireless wake-up radio configuration request message, requesting setup of a distance aware wake-up notification mode to enable the second wireless device to wake-up the primary connectivity radio when it is disabled, in response to a low-power wake-up radio of the second wireless device receiving a wake-up frame from the first wireless device;

Step 604: transmitting, by the first wireless device, to the primary connectivity radio, a wireless wake-up configuration response message comprising a wake-up identifier for the distance aware wake-up notification mode;

Step 606: transmitting, by the first wireless device, to the companion low-power wake-up radio, a wireless wake-up radio measurement reference message; and Step 608: transmitting, by the first wireless device, to the companion low-power wake-up radio, a wake-up frame that includes the wake-up identifier for the distance aware wake-up notification mode, thereby enabling the second wireless device to wake-up the primary connectivity radio, if a receive signal strength of the wireless wake-up frame measured by the companion low-power wake-up radio, is above a reference level value that is at least partly based on a receive signal strength of the wireless wake-up radio measurement reference message measured by the companion low-power wake-up radio.

FIG. 13 illustrates an example embodiment of the invention, wherein examples of removable storage media 126 are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with an example embodiment of the invention.

Although specific example embodiments have been disclosed, a person skilled in the art will understand that changes can be made to the specific example embodiments without departing from the spirit and scope of the invention.

What is claimed is:

1. A method for low-power wireless communication, comprising:

transmitting, by a primary connectivity radio of a first wireless device, a wireless wake-up radio configuration request message to a second wireless device, requesting setup of a distance aware wake-up notification mode to enable the first wireless device to wake-up the primary connectivity radio when it is disabled, in response to a companion low-power wake-up radio of the first wireless device receiving a wake-up frame from the second wireless device;

receiving, by the primary connectivity radio, from the second wireless device, a wireless wake-up configuration response message comprising a wake-up identifier for the distance aware wake-up notification mode;

receiving, by the companion low-power wake-up radio, from the second wireless device, a wireless wake-up radio measurement reference message;

measuring, by the first wireless device, a receive signal strength of the wireless wake-up radio measurement reference message, determining a reference level value based at least partly on the receive signal strength of the wireless wake-up radio measurement reference message, and associating the reference level value with the wake-up identifier for the distance aware wake-up notification mode;

receiving, by the companion low-power wake-up radio, from the second wireless device, a wake-up frame that includes a received wake-up identifier;

measuring, by the companion low-power wake-up radio, a receive signal strength of the wireless wake-up frame; and waking-up, by the first wireless device, the primary connectivity radio, if the receive signal strength of the wireless wake-up frame is above the reference level value and if the received wake-up identifier corresponds to the wake-up identifier for the distance aware wake-up notification mode associated with the reference level value.

2. The method of claim 1, wherein the wireless wake-up radio configuration request message comprises a requested distance, the wireless wake-up radio configuration response message comprises an offset value that is based on the requested distance, and wherein said determining the reference level value comprises determining the reference level value based at least partly on the receive signal strength of the wireless wake-up radio measurement reference message and on the offset value.

3. The method of claim 1, wherein the second wireless device is an access node, such as an access point or base station, or the second wireless device is another non-access point station or a neighbor awareness networking device.

4. The method of claim 1, wherein the wireless wake-up configuration response message comprises an offset value for use with wake-up frames that are to be identified in the distance aware wake-up notification mode, and wherein the determining the reference level value is based at least partly on the offset value.

5. An apparatus, comprising:
at least one processor;
at least one memory including computer program code;
the at least one memory and the computer program code configured to, with the at least one processor, cause the apparatus at least to:
transmit, by a primary connectivity radio of a first wireless device, a wireless wake-up radio configuration request message to a second wireless device, requesting setup of a distance aware wake-up notification mode to enable the first wireless device to wake-up the primary connectivity radio when it is disabled, in response to a companion low-power wake-up radio of the first wireless device receiving a wake-up frame from the second wireless device;

receive, by the primary connectivity radio, from the second wireless device, a wireless wake-up configuration response message comprising a wake-up identifier for the distance aware wake-up notification mode;

receive, by the companion low-power wake-up radio, from the second wireless device, a wireless wake-up radio measurement reference message;

measure, by the first wireless device, a receive signal strength of the wireless wake-up radio measurement reference message, determine a reference level value based at least partly on the receive signal strength of the wireless wake-up radio measurement reference message, and associate the reference level value with the wake-up identifier for the distance aware wake-up notification mode;

receive, by the companion low-power wake-up radio, from the second wireless device, a wake-up frame that includes a received wake-up identifier;

measure, by the companion low-power wake-up radio, a receive signal strength of the wireless wake-up frame; and wake-up, by the first wireless device, the primary connectivity radio, if the receive signal strength of the wireless wake-up frame is above the reference level value and if the received wake-up identifier corresponds to the wake-up identifier for the distance aware wake-up notification mode associated with the reference level value.

6. The apparatus of claim 5, wherein the wireless wake-up radio configuration request message comprises a requested distance, the wireless wake-up radio configuration response message comprises an offset value that is based on the requested distance, and wherein said determining the reference level value comprises determining the reference level value based at least partly on the receive signal strength of the wireless wake-up radio measurement reference message and on the offset value.

7. The apparatus of claim 5, wherein the second wireless device is an access node, such as an access point or base station, or the second wireless device is another non-access point station or a neighbor awareness networking device.

8. The apparatus of claim 5, wherein the wireless wake-up configuration response message comprises an offset value for use with wake-up frames that are to be identified in the distance aware wake-up notification mode, and wherein the determining the reference level value is based at least partly on the offset value.

9. An apparatus, comprising:
at least one processor;
at least one memory including computer program code;
the at least one memory and the computer program code configured to, with the at least one processor, cause the apparatus at least to:
receive, by a first wireless device, from a primary connectivity radio of a second wireless device, a wireless wake-up radio configuration request message, requesting setup of a distance aware wake-up notification mode to enable the second wireless device to wake-up the primary connectivity radio when it is disabled, in response to a low-power wake-up radio of the second wireless device receiving a wake-up frame from the first wireless device;

transmit, by the first wireless device, to the primary connectivity radio, a wireless wake-up configuration response message comprising a wake-up identifier for the distance aware wake-up notification mode;

transmit, by the first wireless device, to the companion low-power wake-up radio, a wireless wake-up radio measurement reference message; and transmit, by the first wireless device, to the companion low-power wake-up radio, a wake-up frame that includes the wake-up identifier for the distance aware wake-up notification mode, thereby enabling the second wireless device to wake-up the primary connectivity radio, if a receive signal strength of the wireless wake-up frame measured by the companion low-power wake-up radio, is above a reference level value that is at least partly based on a receive signal strength of the wireless wake-up radio measurement reference message measured by the companion low-power wake-up radio.

10. The apparatus of claim 9, wherein the first wireless device is an access node, such as an access point or base station or the first wireless device is another non-access point station or a neighbor awareness networking device.

11. The apparatus of claim 9, further comprising:
the at least one memory and the computer program code configured to, with the at least one processor, cause the apparatus at least to:
measure, by the first wireless device, a received signal strength of the wireless wake-up radio configuration request message, estimate path loss between the second wireless device and the first wireless device, and estimate a current distance between the second wireless device and the first wireless device based on the path loss estimate.

12. The apparatus of claim 9, wherein the wireless wake-up configuration response message comprises an offset value for use with wake-up frames that are to be identified in the distance aware wake-up notification mode.

13. The apparatus of claim 9, wherein the wireless wake-up radio measurement reference message is transmitted at a transmit power corresponding to a sum of a reference level value, an offset value, and an estimated path loss or the wireless wake-up radio measurement reference message is transmitted at a transmit power having a fixed value.

14. The apparatus of claim 9, wherein the wireless wake-up radio configuration request message comprises a requested distance, the wireless wake-up radio configuration response message comprises an offset value for use with wake-up frames that are to be identified in the distance aware wake-up notification mode, and the offset value is based on the requested distance.

* * * * *